Jan. 3, 1939.  W. H. SICKINGER  2,142,381
ELECTRIC OVEN
Filed Nov. 24, 1936  2 Sheets-Sheet 1
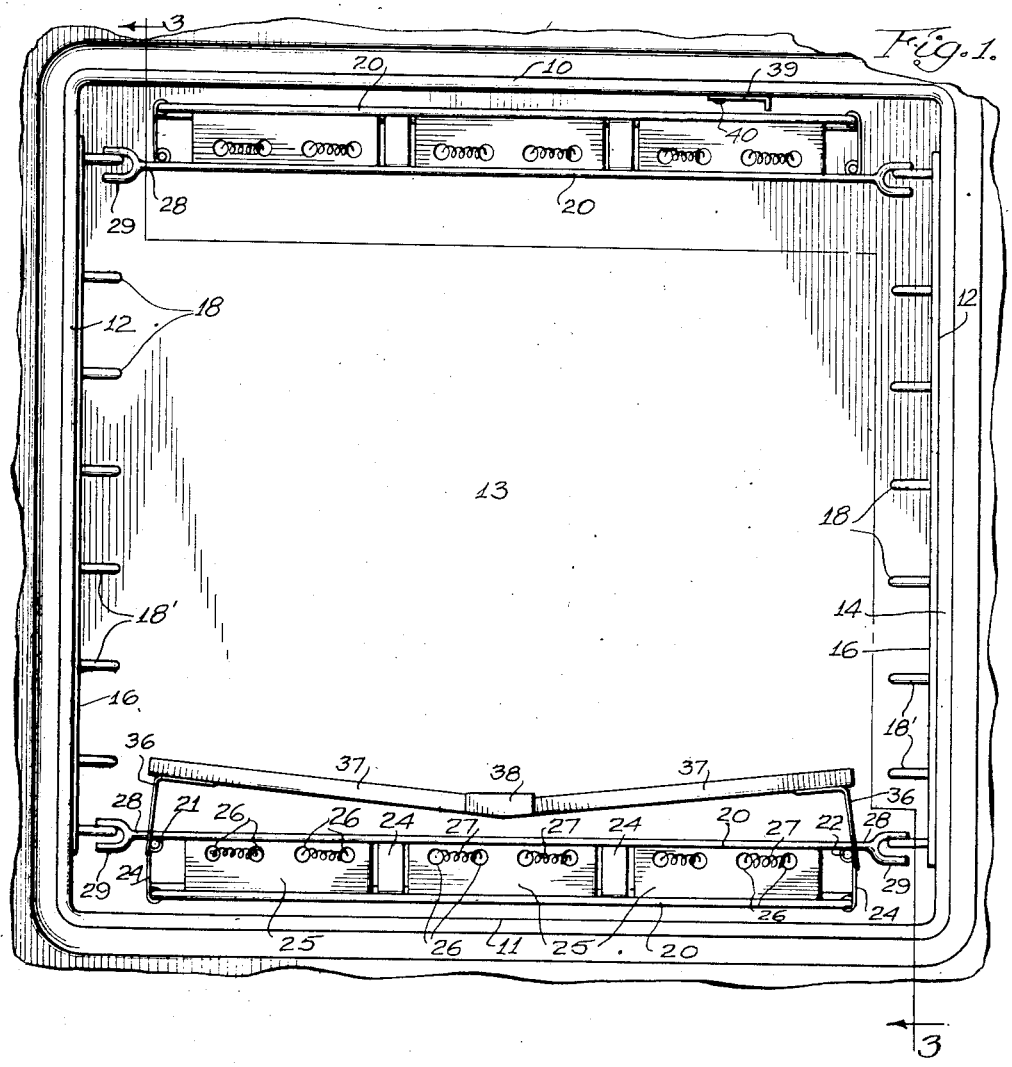
Fig. 1.
Fig. 2.
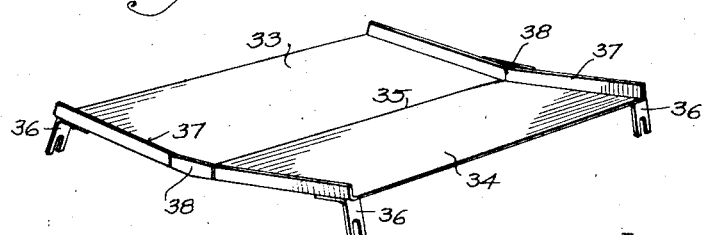
Inventor
William H. Sickinger,
By Fisher, Clapp, Soans & Pond,
Attys.

Jan. 3, 1939.   W. H. SICKINGER   2,142,381
ELECTRIC OVEN
Filed Nov. 24, 1936   2 Sheets-Sheet 2
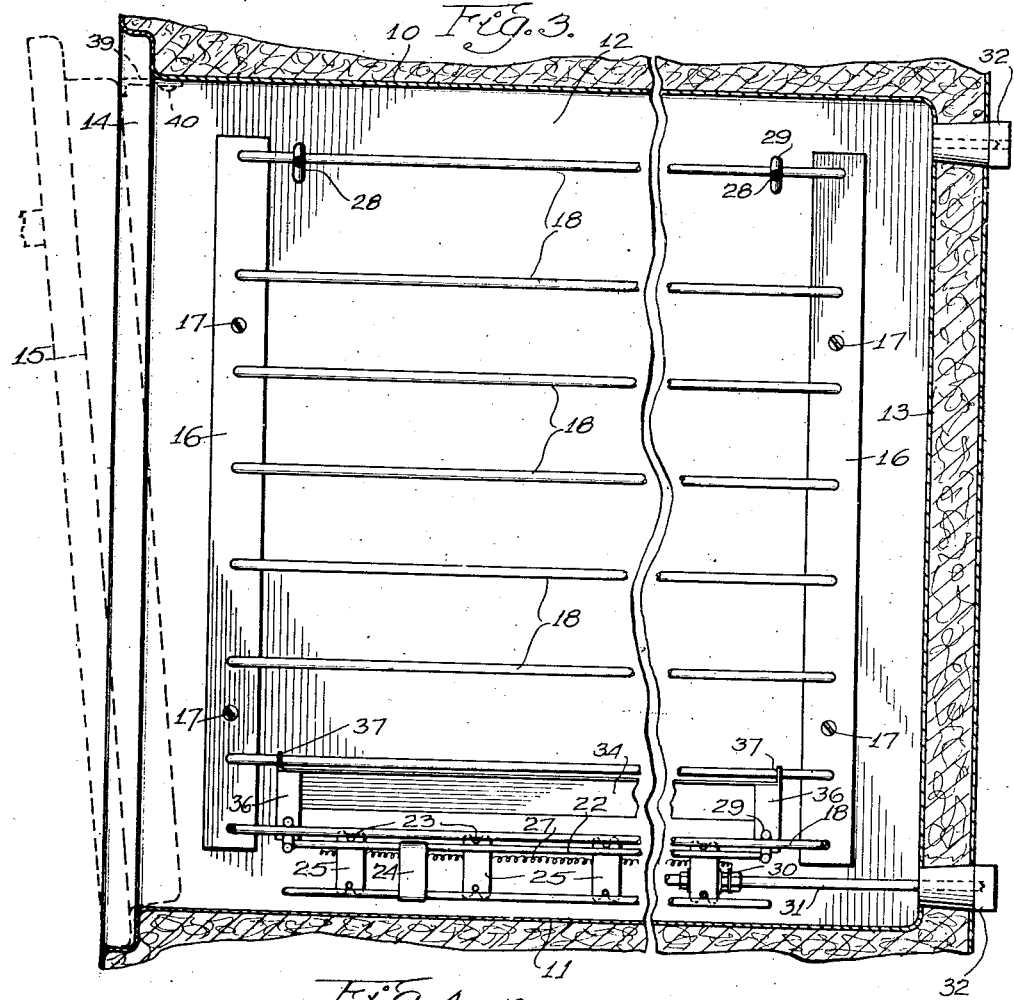
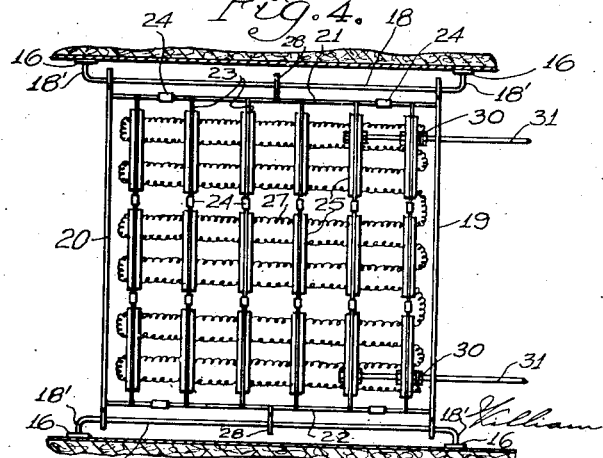
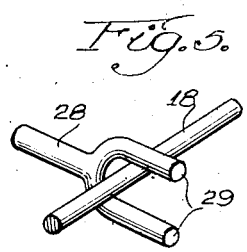
Inventor
William H. Sickinger,
By Fisher, Clapp, Soans & Pond, Attys.

Patented Jan. 3, 1939

2,142,381

UNITED STATES PATENT OFFICE 2,142,381

ELECTRIC OVEN

William H. Sickinger, Chicago, Ill., assignor to Crown Stove Works, Cicero, Ill., a corporation of Illinois Application November 24, 1936, Serial No. 112,542

3 Claims. (Cl. 219—35)

This invention relates to the art of electric ovens, more especially ovens used for baking and broiling, and wherein the heat is supplied by an electric heating unit at the bottom of the oven chamber for baking or roasting purposes, and at the top of the oven chamber for broiling. In some electric ovens the heating unit is permanently built into the wall or walls of the oven chamber, and in others it is bodily insertable and removable. As to most of its improved features, the present invention belongs to the latter class.

In prior constructions with which I am acquainted, the electric heating unit has been supported either directly on the bottom wall or floor of the oven chamber or on flat ledges on the side walls of the oven chamber, as a consequence of which a considerable portion of the heat generated by the unit passes by conduction to the walls of the oven and is practically lost. One object of the present invention has been to provide an improved means for supporting the heating unit in the oven chamber that will in large measure prevent this loss and will, at the same time, permit a free circulation of heated air beneath and around, as well as above, the heating unit, whereby virtually all of the heat given off by the unit goes into the air in the oven instead of a considerable portion going into the walls of the oven.

Another object of the invention has been to provide an improved supporting means for the heating unit through the use of which the latter may be mounted in the bottom of the oven for baking or roasting, and, by simple inversion may be similarly mounted in the top of the oven for broiling.

Another object has been to provide a simple and inexpensive form of rack for attachment to the side walls of the oven, including spaced horizontal rods the lowermost and uppermost of which are adapted to support an electric heating unit for baking and broiling purposes respectively, and the remainder to support baking pans and broiling grids at varying distances from the heating unit.

Still other objects and attendant advantages of the invention will be apparent to cooks and others skilled in the art from the following detailed description, taken in connection with the accompanying drawings in which I have illustrated a selected and approved embodiment of the invention well adapted to effectuate the stated purposes and objects thereof, and wherein—

Fig. 1 is a front elevation of the oven, omitting the usual outwardly and downwardly opening hinged door, and showing a bottom heating unit therein and also a similar inverted top heating unit, either or both of which may be used at the same time.

Fig. 2 is an isolated perspective view of the combination air deflector and drip pan.

Fig. 3 is a vertical section on the staggered line 3—3 of Fig. 1.

Fig. 4 is a top plan, on a reduced scale, of the bottom heating unit appearing in Figs. 1 and 3 and its supports, the side walls of the oven chamber appearing in fragmentary horizontal section.

Fig. 5 is a fragmentary perspective of the sliding heating unit point contact support.

Referring to the drawings, Figs. 1 and 3 show a rectangular oven formed by top and bottom walls 10 and 11, side walls 12, and a rear wall 13, the front of the oven having the customary countersunk opening 14, on the lower margin of which is mounted by the usual spring hinges (not shown) a downwardly opening door indicated in dotted lines by 15 in Fig. 3. The walls are preferably insulated as shown in Fig. 3, and the structure as thus far described is old and common in cooking stoves and ranges.

The oven chamber is designed to be heated by a preferably portable and removable heating unit, herein shown as an electric heater; and for supporting said heating unit and cooking utensils within the oven, I employ on the inner sides of the side walls 12 a pair of racks, each comprising a pair of flat vertical bars or strips 16 directly attached to said side walls as by screws 17, and a group of vertically spaced rods 18 formed with elbow end portions 18' (Fig. 4) welded or otherwise secured to the bars 16. The rods 18 are preferably of round cross section, as shown in Fig. 5.

The electric heating unit, shown in plan view in Fig. 4 and in edge elevation in Figs. 1 and 3, is, except as to the means for slidably supporting it on the rack bars or rods 18, a known structure. Briefly described, it is made up of upper and lower grid frames each comprising transverse rods 19 and 20, longitudinal rods 21 and 22 at their ends welded to the rods 19 and 20, intermediate transverse rods 23, and vertical spacers 24 connecting and spacing the two grid frames. Mounted between the upper and lower grid frames are porcelain blocks 25 grooved on their upper and lower longitudinal edges to receive and be supported by the rods 23, and these blocks are formed with registering apertures 26, through which is threaded a heating coil 27. In accordance with the present invention the rods 19 and 20 of the upper grid frame are continued to form lateral extensions 28 which preferably have forked ends 29 that are adapted to be slidably supported on the rack bars or rods 18, as clearly shown in Figs. 3, 4 and 5. As shown in Fig. 5, the tines of the forks 29 are of round cross section, so that the contact of the fork on the supporting rod is a point contact, which reduces the conduction of heat from the heating unit to the oven walls to a minimum. For a greater rigidity of the heating unit when supported in the oven as described, the longitudinal rods 21 and 22 of the upper grid frame are preferably equipped with one or more intermediate forked extensions 28, as shown in Fig. 4.

The rods 18 of the bottom pair are designed to support a lower heating unit in upright position, as shown in Figs. 1 and 3, and the rods 18 of the top pair are designed to support the same or a similar unit in inverted position, as shown in Fig. 1. The intermediate rods are designed to support cooking utensils, such as baking pans and broiler grids at varying distances from the heaters.

The heating unit has been designed to automatically effect electric connection of the heating coil with a source of current as the unit is pushed fully into the oven. To this end, the two ends of the coil 27 are electrically connected at 30 to a pair of contact terminal prongs 31 that extend beyond the rear edge of the unit and are adapted to enter a pair of contact terminal sockets 32 mounted in the rear wall 13 of the oven chamber at a suitable height to be automatically engaged by said prongs. Two pairs of such sockets are preferably employed,—a lower pair for coupling with the terminal prongs of the lower heating unit, and an upper pair suitably located to automatically couple with the prongs of a top heating unit. The leads from the source of current to the oven will preferably have therein a manually operated switch (not shown) which will be normally open, but will be closed when either or both of the heating units is in service position within the oven, so as to prevent useless consumption of current when the oven is idle through leaving either or both of the heating units in situ.

It will be observed from Figs. 1 and 3 that the top and bottom rails 18, which support the heating unit or units, are at such a distance from the top and bottom walls of the oven chamber that the heating unit in both positions is entirely out of contact with the top and bottom walls of the chamber; the only contacts of the heating unit with the walls of the chamber being the point contacts above referred to. This permits a free circulation of the air in the chamber above, below and all around the heating unit so that virtually all of the heat given off goes into the air and practically none is lost by conduction to and radiation from the oven walls. The coil of the lower heater, of course, imparts a high degree of heat to the body of air directly overlying the coil; and to prevent danger of burning the article being baked or roasted, and also to effect a more uniform application of the oven heat to the article, I provide an accessory in the nature of a deflector plate which appears in end elevation in Fig. 1, in side elevation in Fig. 3, and in isolated perspective in Fig. 2. Preferably, and as herein shown, this deflector consists of a rectangular plate, the two longitudinal halves 33 and 34 of which incline upwardly from the longitudinal center line 35 of the plate, the latter having substantially the same area as the heating unit, and being supported preferably by corner legs 36 that are preferably forked at their lower ends to straddle the extensions 28 of the grid rods 19 and 20. Obviously, the hot air rising from the upper surface of the heater strikes the lower sides of the inclined halves 33 and 34 of the plate and is thereby deflected toward the side walls of the oven. The ends of the deflector plate are bent upwardly to form flanges 37 which are slit at the center line to permit bending and are then spot welded to braces 38.

As previously stated, it is desirable when broiling steaks or chops in an oven of this type, to leave the oven door slightly open to both permit escape of smoke and fumes and lessen the danger of accidental burning. To this end I employ in connection with the spring hinged door 15, which normally closes itself when partly raised from fully opened position, a stop member mounted on a wall of the oven chamber and shiftable between positions wherein it prevents and permits a full closing of the door. This stop preferably takes the form of a finger 39 pivoted at 40 on the top wall 10 of the oven chamber, which finger is shiftable angularly between a position wherein it projects across the entrance end of the oven and blocks the full closing of the door, as shown by dotted lines in Fig. 3, and a position wherein it lies within or behind the said entrance and, as shown by full lines in Fig. 1, permits the full closing of the door.

It is believed that the novel improved features of the oven herein above described and illustrated in the drawings, and the manner in which they effectuate the stated purposes and objects of the invention, will be clear from the foregoing description and illustration; but it is to be understood that such description and illustration are exemplary only and not limiting of the scope of the invention, as defined in the following claims.

I claim:

1. In an electric oven, the combination of horizontal supports on the side walls of the oven, a heating unit, and lateral projections on said unit resting on said supports, said projections and supports having single point contact only with each other.

2. In an electric oven, the combination of horizontal rails of round cross section on the side walls of the oven, a heating unit, and independent lateral projections of round cross section on said unit supporting on and crosswise of said rails, and having single point contact only with the latter.

3. In an electric oven, the combination of a pair of horizontal rails of round cross section on the side walls of the oven, an electric heating unit, and independent lateral projections on each side of said unit having forked ends adapted to slidably engage said rails in either the upright or inverted position of said unit, the tines of said forked ends being vertically spaced and of round cross section.

WILLIAM H. SICKINGER.